May 17, 1949.  A. W. RANKIN  2,470,522
DAMPER WINDING FOR DYNAMOELECTRIC MACHINES
Filed Aug. 7, 1947

Inventor:
Andrew W. Rankin,
by *Prowell S. Mack*
His Attorney.

Patented May 17, 1949

2,470,522

UNITED STATES PATENT OFFICE 2,470,522

DAMPER WINDING FOR DYNAMOELECTRIC MACHINES

Andrew W. Rankin, Schenectady, N. Y., assignor to General Electric Company, a corporation of New York Application August 7, 1947, Serial No. 767,155

5 Claims. (Cl. 171—252)

My invention relates to dynamoelectric machines and, more particularly, to a damper winding construction for alternating current machines of the synchronous type.

An object of my invention is to provide an improved damper winding construction.

A still further object of my invention is to provide more uniform current distribution in conductors of a loaded damping winding to prevent mechanical and electrical failure of said winding.

The means employed in the embodiments herein illustrated and described comprise a slot damper winding arranged in pole face slots and electrically unsymmetrical with respect to a main polar axis, the lack of symmetry being just sufficient to overcome the effective inequality conventionally existing between current values in conductors located in leading and trailing pole halves.

Figure 1:
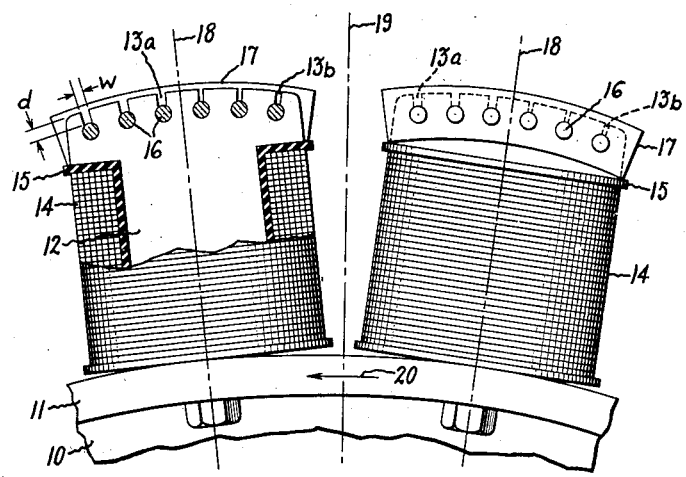
Figure 2:
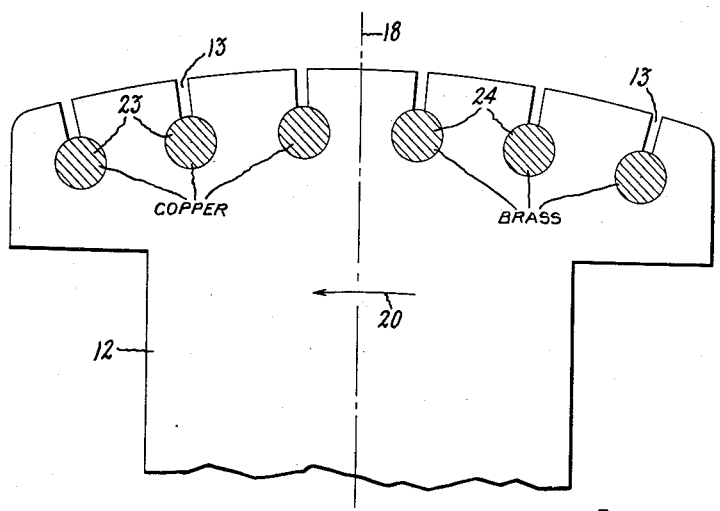

Further objects and advantages of my invention will become apparent and my invention will be better understood from consideration of the following description taken in connection with the accompanying drawing, in which Fig. 1 is a fragmentary view of a dynamoelectric machine rotor having pole pieces (one of which is partly broken away) incorporating an embodiment of my invention, and Fig. 2 is a large cross-sectional view of a single pole piece provided with another embodiment of my invention.

Referring to the drawing, I have shown in Fig. 1 a portion of the rotor of a dynamoelectric machine of the synchronous alternating current type. Said rotor has a supporting web 10 adapted to be mounted on a suitable shaft and provided with a circumferentially extending flange 11 of magnetic material. Salient pole pieces secured to said flange each include a laminated core 12 of magnetic material having winding slots such as 13a (to the left of center) and 13b (to the right of center) formed therein adjacent the radially outer ends of the pole pieces. A field exciting winding 14 is mounted about each pole piece and insulated therefrom by a suitable insulator element 15. As is conventional in a synchronous machine, the rotor winding 14 is a direct current field winding, the principal alternating current windings being located in the stator portion which is not shown in the drawing. There is also provided a damper winding including a plurality of transverse conductors 16 located in the winding slots 13a and 13b, the transverse conductors being short circuited by end conductors 17 at each side of the pole to complete the winding. The ends of the slot conductors 16 are secured to end conductors 17 by extending through openings therein and being formed as rivets or by being welded to each of these end conductors. Such a winding is often called an amortisseur or starting winding but I prefer to think of it as a damper winding since it always functions as such to dampen out torsional oscillations, but functions as a starting winding only in the event that the dynamoelectric machine is used as a motor rather than as a generator.

I have also shown in the drawing, a center line 18 through the center of each pole piece and representing a direct (or mid-polar) axis and a center line 19 midway between poles representing a quadrature (or inter-polar) axis. These designations are well known to those skilled in the art to which my invention relates. In my invention I have provided a damper winding which is unsymmetric with respect to the direct axis 18. In the embodiment illustrated in Fig. 1, this is provided by having slot conductors of uniform spacing and cross-section located in mouthed slots 13a and 13b, slots 13a at one side of the direct axis having wider mouths than the slots 13b at the other side. With a counterclockwise direction of rotation as shown by the bottom arrow 20 in Fig. 1, the wide mouthed slots 13a are located in the leading half of each pole piece and the narrower mouthed slots 13b are located in the trailing half of each pole piece, providing a reactance-resistance ratio with less impedance in the conductors located in slots in the leading pole half with respect to conductors located in slots in the trailing pole half to provide substantially the same loading in all of said conductors as hereinafter more fully explained.

It will be obvious to those skilled in the art that the desired result, i. e. electrical unsymmetry, could be achieved in various other ways besides having different width slot mouths. In Fig. 2 I have shown an embodiment in which the slot structure is identical throughout the pole but the same result is achieved by using different material for the conductors.

Fig. 2 illustrates a cross-sectional view of a portion of a single pole piece including the core 12 of laminated magnetic material having winding slots 13 formed therein and a damper winding arranged in the winding slots. In the embodiment shown in Fig. 2, the winding slots 13 and their mouths are all of uniform construction, the winding arrangement being made unsymmetric with respect to the direct axis 18 by using slot conductors of different material on each side thereof. Thus the conductors 23 in the winding slots to the left of the direct axis as viewed in the drawing, may conveniently be made of copper and the slot conductors 24 to the right of the direct axis 18 be made of brass, it being assumed that the direction of rotation is again counterclockwise as shown by the bottom arrow 20. It is assumed also that the slot conductors are short circuited at their ends as shown in Fig. 1, although this detail is not shown in Fig. 2.

With the constructions which I have shown and described, or with any construction which is carefully designed to be properly unsymmetric with respect to the direct axis of each pole, it is possible to load the leading and trailing pole half damping or slot conductors more evenly than is possible with conventional symmetrical constructions. With conventional constructions bars in the trailing pole halves are usually loaded more heavily than similar bars in the leading pole halves. This fact may be confirmed by observing the physical condition of damper windings which have been in actual service.

The study of current values in a winding of this type can best be made by considering the current in each bar as the vectorial sum of a component caused by flux in the direct axis and a component caused by flux in the quadrature axis. Then, if the physical current in a bar in the trailing pole half be thought of as equal to the vector sum of direct axis current and quadrature axis current, the physical current in a corresponding bar in the leading pole half will be equal to the vector difference of these same quantities. If the direct and quadrature components were truly 90 deg. out of phase, the vectorial sum of the quantities would be the same as their difference. However, the physical arrangement of the direct and quadrature axes are not similar, there being a small effective gap in the one axis and a relatively large gap in the other. Therefore, the two components are not in 90 deg. phase relationship and, in a symmetrical damper winding construction, the leading and trailing pole halves are not equally loaded, the current being greater in the conductors of a single pole half. By proper design the reactance-resistance ratios of the transverse conductors may be so selected that the direct and quadrature axis current components can be placed in true quadrature, at least for certain severe loaded conditions such as occur at starting (when the machine is used as a motor) or during single phase loading (when the machine is being used as a generator). It will be obvious that with the more equal loading provided by my invention there will be less likelihood of failure of the windings due to crystallization or distortion of conductor or of surrounding magnetic material due to excessive currents in a single conductor.

In the embodiment of Fig. 1, for example, where $d$ represents the depth of each conductor from the periphery of the rotor, and $w$ represents the width of the slot mouth, the $d/w$ ratio is small in the leading pole half and large in the trailing pole half, the value of $d$ being the same in each case. A large leakage reactance is obtained by using the large $d/w$ ratio and a small leakage reactance is obtained by using the small $d/w$ ratio.

In the embodiment shown in Fig. 2, the effective leakage reactance is the same throughout but the resistance component is less in the leading pole half which is provided with conductors of copper which produce a relatively small resistance component with respect to the brass conductors in the trailing pole half, the latter producing a relatively high resistance component to effectively shift the time phase relationship to the desired value. There is thus provided a device of the character described capable of providing uniform current distribution in damper winding conductors so that they will not get too hot, expand too much or otherwise become susceptible to failure.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having salient pole pieces of magnetic material with winding slots therein, and a damper winding in said slots, said winding having reactance-resistance ratio characteristic in the leading half of each pole piece which, when measured at standstill, is unsymmetric with respect to the reactance-resistance ratio characteristic of said winding in the trailing half of each pole piece.

2. A dynamoelectric machine of the synchronous alternating current type having a rotatable member provided with salient pole pieces of magnetic material with mouthed winding slots therein, a damper winding including conductors symmetrically arranged in said slots, means for connecting said conductors for completing said winding, the mouths of the slots in the leading half of each of said pole pieces being substantially larger than the mouths of the slots in the trailing half of each of said pole pieces, whereby damper winding slotted conductors in leading and trailing pole halves may be equally loaded.

3. A dynamoelectric machine of the synchronous type having a core of magnetic material with mouthed winding slots therein, a damper winding including uniform conductors symmetrically arranged in said slots, the mouths of the slots in one half of each of said pole pieces being larger than the mouths of the slots in the other half of each of said pole pieces whereby current may be equally distributed between slotted conductors in the two pole halves at certain loads.

4. A dynamoelectric machine of the synchronous type having a rotatable member provided with salient pole pieces of magnetic material, a direct current field winding on each of said pole pieces, a plurality of winding slots adjacent the outer peripheral edge of each of said pole pieces, a damper winding including conductors in said slots, means including end conductors for connecting together said slot conductors to complete said winding, and means including a difference in the amount of magnetic material surrounding slotted conductors in leading pole halves with respect to the amount of magnetic material surrounding slotted conductors in trailing pole halves whereby the time phase of direct and quadrature components of current in each of said conductors may be made substantially equal to 90 degrees so that the vectorial sum and difference of said current components will be substantially the same.

5. A dynamoelectric machine of the synchronous type having a rotatable member provided with salient pole pieces of magnetic material with a plurality of winding slots therein, a damper winding including conductors in said slots, means for electrically connecting together said conductors to complete said winding, said conductors comprising conductors located in slots in the nominally leading half of each pole piece and comprising conductors located in slots in the nominally trailing half of each pole piece with the resistivity of substantially all the conductors in leading pole halves being a predetermined amount less than the resistivity of substantially all conductors in trailing pole halves, said predetermined amount being such that for normal operation at rated load the time phase between direct and quadrature current components in each of said conductors will be substantially equal to 90 degrees and the vectorial sum and difference of said current components will be equal, whereby all of said conductors will be substantially equally loaded during such normal operation.

ANDREW W. RANKIN.

REFERENCES CITED

The following references are of record in the file of this patent:

UNITED STATES PATENTS

| Number | Name | Date |
|---|---|---|
| 980,183 | Bache-Wiig | Jan. 3, 1911 |
| 1,605,589 | Hunt | Nov. 2, 1926 |
| 1,698,556 | Mortensen | Jan. 8, 1929 |
| 1,945,028 | D'Almaine et al. | Jan. 30, 1934 |
| 2,087,406 | Hutchins | July 20, 1937 |